July 30, 1957 A. J. BARDINI 2,800,937
APPARATUS FOR PROCESSING FRUIT
Filed June 13, 1955 2 Sheets-Sheet 1
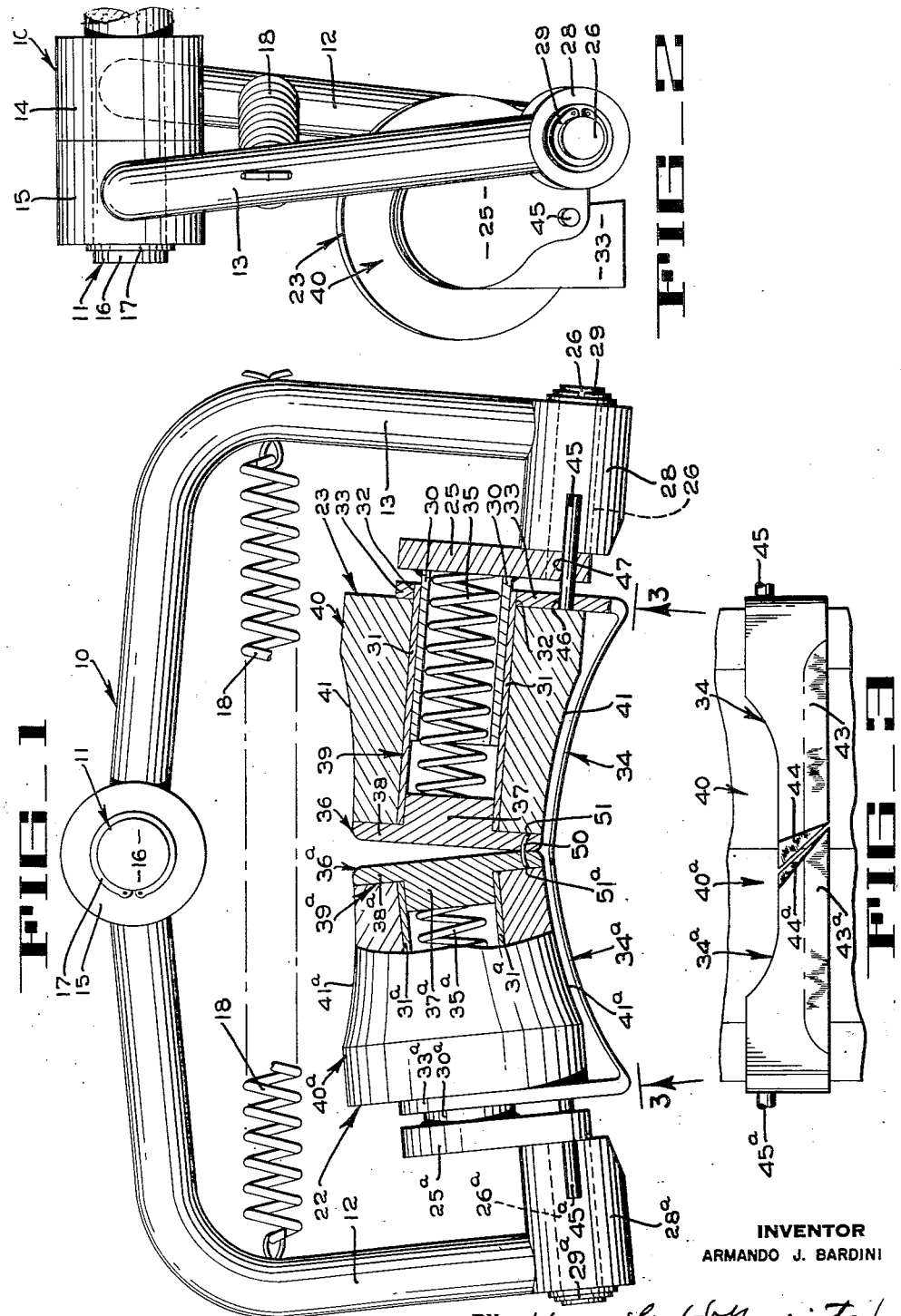
INVENTOR
ARMANDO J. BARDINI
BY
ATTORNEY

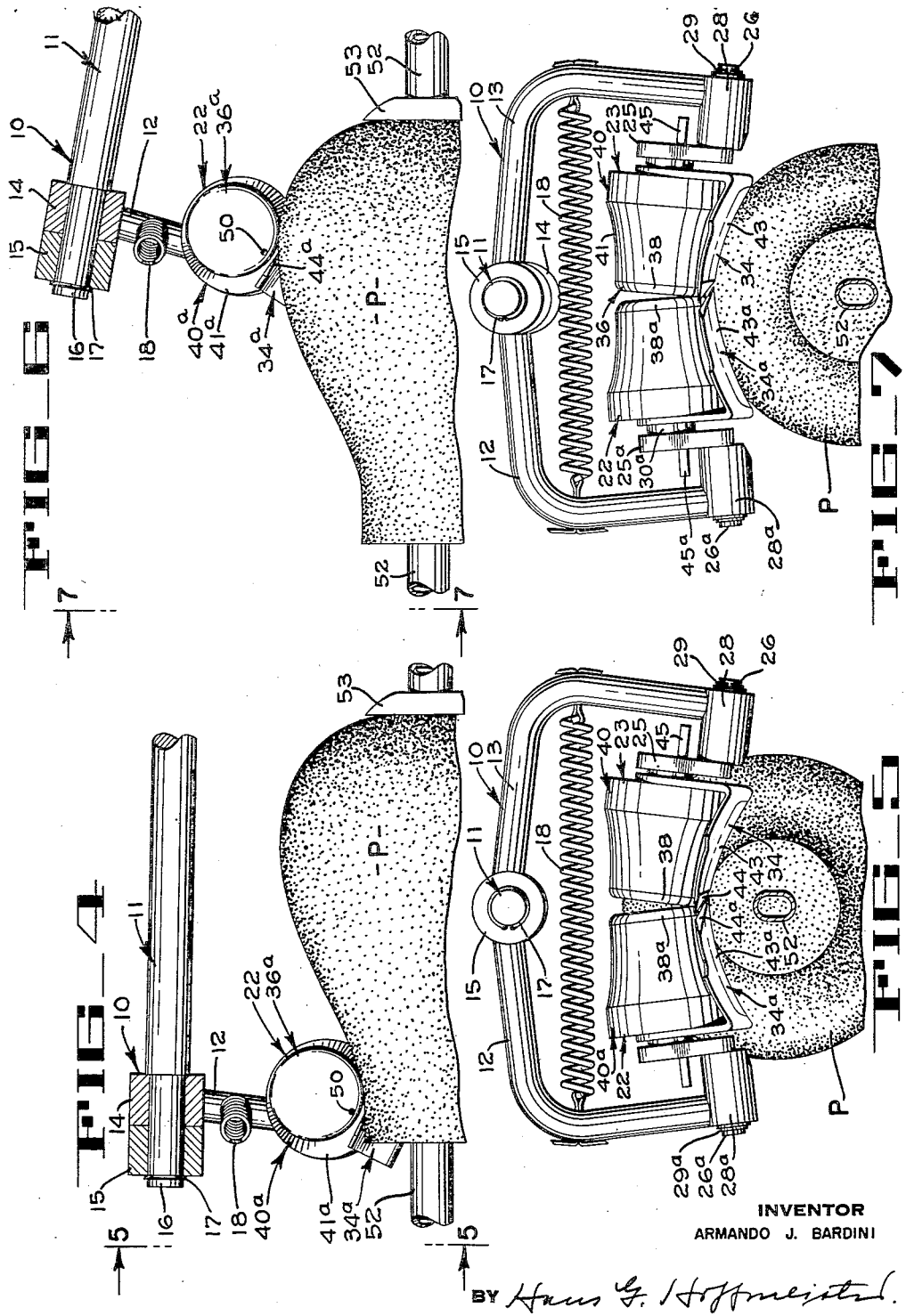

United States Patent Office 2,800,937
Patented July 30, 1957

2,800,937
APPARATUS FOR PROCESSING FRUIT

Armando J. Bardini, San Jose, Calif., assignor to Food Machinery and Chemical Corporation, San Jose, Calif., a corporation of Delaware Application June 13, 1955, Serial No. 514,890

13 Claims. (Cl. 146—43)

This invention pertains to machinery for processing fruit and more particularly relates to an improved device for peeling fruit, such as pears and the like.

In one method of peeling pears commercially, each pear is impaled on a rotatable spindle and held in a generally horizontal position while a cutting blade is drawn along the length of the pear to slice a longitudinal strip of peel therefrom. The spindle is then indexed angularly to rotate the pear about its axis to present an unpeeled surface to the next cutting stroke of the knife. Usually eight longitudinal overlapping cuts are made during the peeling of the entire surface of a pear, each cut covering a transverse arc of slightly more than 45 degrees of the surface. The butt end of a pear has a larger diameter than the stem end and, accordingly, the transverse arc of curvature of the butt end is flatter than the arc of curvature of the stem end. Since the cutting blade must maintain peeling contact with the large diameter butt end of the pear, it cannot have a greater arc of curvature than the curvature of the butt end and, therefore, it must be curved in a relatively flat arc. If such a flat blade will cover a 45 degree arc at the butt end of the pear, it will not cover a 45 degree arc at the sharply curved stem end unless it is gauged to cut deeply into the pear. Therefore, it has heretofore been necessary to use a flat blade, designed to accommodate the butt end, and gauge the blade to take a deep cut all along the length of the pear so that the necessary arc will be covered at the stem end. As a result of the deep cut a considerable amount of the meat of each pear has been wasted. It is also apparent that a blade designed for pears having large butt ends will have too flat an arc for even the butt end of smaller pears. Accordingly, it is an object of the present invention to provide a peeling cutter capable of automatically adjusting itself to efficiently remove peel from pears of varying size and curvature.

Another object is to provide a peeling cutter adapted to remove strips of peel of a desirable width and thickness from the entire length of a pear.

Other and further objects and advantages of the present invention will become apparent from the following description taken in connection with the accompanying drawings, in which:

Fig. 1 is a front elevation, partly in section and partly broken away, of one embodiment of the cutter assembly of the present invention.

Fig. 2 is a fragmentary side elevation of the cutter assembly of Fig. 1.

Fig. 3 is a fragmentary bottom plan of the cutting blades used in the cutter assembly of Fig. 1, the view being taken looking in the direction of arrows 3—3 of Fig. 1.

Fig. 4 is a fragmentary vertical section taken centrally through a cuttter assembly disposed in peeling contact with the stem end of a pear.

Fig 5 is a front elevation taken in the direction of arrows 5—5 of Fig. 4.

Fig. 6 is a fragmentary vertical section taken centrally through a cutter disposed in peeling contact with the butt end of a pear.

Fig. 7 is a front elevation taken in the direction of arrows 7—7 of Fig. 6.

In the usual type of peeling knife, such as that disclosed in the Thompson Patent No. 2,335,619, a rigid blade and guide roller are pivotally mounted between the arms of a rigid yoke. Since the blade is rigid, it is capable of adapting itself to only a small range of pear shapes. When it traverses pear surfaces to which it is not specifically adapted, it must take a deep cut in order to remove a strip of peel of the necessary width. In the present invention, the cutting blade is made up of two aligned cooperating blades, each blade having a separate guide roller and being mounted on one of two pivotal arms of an expansible and contractible yoke. With this arrangement, each cutting blade can automatically adjust itself to the contour of the surface being peeled, and the two blades, moving in transversely aligned relation, cooperate to provide a continuous cutting edge that changes its curvature as it moves along the length of the pear, to remove a strip of peel of substantially uniform thickness and of the desired width.

In Figs. 1 and 2 the reference numeral 10 indicates a peeling head comprising a support rod 11 on which two yoke arms 12 and 13 are pivotally mounted. The arms 12 and 13 have hub portions 14 and 15, respectively, secured in abutting relation on a reduced diameter end portion 16 of the rod 11 by a snap ring 17. A spring 18 is connected between the arms 12 and 13 and tends to pivot the arms toward each other. Substantially identical, oppositely disposed cutter assemblies 22 and 23 are mounted in cooperating, abutting relation on the lower ends of the arms 12 and 13, respectively. Since the cutter assemblies 22 and 23 are mounted on their associated arms in an identical manner, a detailed description of the cutter assembly 23 will be sufficient for a complete understanding of both cutter assemblies. Parts on cutter assembly 22 that are identical to parts on cutter 23 will be given identical reference numerals followed by the suffix "a."

The cutter 23 comprises a flat mounting plate 25 (Figs. 1 and 2) having a shaft 26 which projects outwardly from the plate 25 and is rotatably journalled in a hub 28 formed on the lower end of the yoke arm 13. A snap ring 29 retains the shaft 26 on the hub 28. Near its upper end, the mounting plate 25 carries a tubular shaft 30 which is rotatably journalled in a bearing sleeve 31 pressed in an aperture 32 in the upper end of a flange 33 which carries a cutting blade 34. A compression spring 35 is disposed in the tubular shaft 30 between the mounting plate 25 and an end plug 36, that has a central portion 37 pressed in the bearing sleeve 31 and a circular flange 38 disposed generally parallel to the mounting flange 33 of the cutting blade. It will be noted that, since both the cutter mounting flange 33 and the end plug flange 38 are secured to the bearing sleeve 31, a rigid spool-like member 39 is formed by the flanges and the sleeve. A guide roller 40, which has a generally frusto-conical surface portion 41, is rotatably journalled on the bearing sleeve 31 of the spool 39. The cutting blade 34 has a curved configuration which corresponds generally to the contour of the frusto-conical portion 41 of the guide roller 40. As seen in Fig. 3, the blade 34 has a sharpened forward edge 43 and a sharpened outer end 44 which is disposed behind the sharpened outer end of the blade 34a.

The spool 39 is connected to the mounting plate 25 for pivoting movement therewith by means of a pin 45 that is pressed in a hole 46 in the cutter mounting flange 33 and is slidably disposed in a hole 47 in the mounting plate 25. With this arrangement, the spool 39 can move in an axial direction relative to the plate 25 but will pivot about the axis of the shaft 26 with the plate when the plate is pivoted.

In order that the peel cut by the cooperating blades 34 and 34a is continuous across its width, it is necessary that the ends of the blades be maintained in overlapping relation i. e., one behind the other as shown in Fig. 3. Accordingly, the compression springs 35 and 35a are arranged to urge the spools 39 and 39a toward the central, abutting position shown in Fig. 1. In addition, the spools are connected together by an anchor 50 in the form of a stiff wire that is tightly disposed in slanted holes 51 and 51a in the flanges 38 and 38a of the spools.

Referring to Figs. 4 and 5, a peeling head 10 is shown positioned in cutting contact with the surface of the stem end of a pear P impaled on a support spindle 52 that cooperates with a butt stop 53 to hold the pear with the stem-blossom axis in fixed position during the peeling operation. The rod 11 positions the head so that the yoke arms 12 and 13 swing in a transverse plane of the pear. As fully explained in the previously mentioned Thompson patent, the rod 11 is the means by which the head is moved longitudinally of the pear along a path generally parallel to the axis of the pear. As the head moves toward the large butt end of the pear, the guide rollers 40 and 40a move over the pear surface and, as the curvature of the surface increases, the rollers swing the yoke arms 12 and 13 outwardly, i. e., away from each other, causing the cooperating blades 34 and 34a to form a flatter cutting edge. At the same time the compression springs 35 and 35a and the anchor 50 exert a pressure on the spools 39 and 39a to maintain the blades in overlapping relation. By the time the cutter head 10 has reached the butt end of the pear, as shown in Figs. 6 and 7, the blades have assumed a rather flat arc corresponding to the arc of curvature of the pear. When the pear passes from beneath the cutter head, the blades return to their initial arced configuration.

From the foregoing description it will be evident that the present invention provides an efficient peeling head for a pear peeling machine. Since the pivotal mounting of the guide rollers and the cutting blades permits the blades to conform to the surface of the pear, the blades can be gauged to take a cut just deep enough to remove a strip of peel having the desired width along the entire length of the pear. The arrangement of the compression springs and the anchor 50 positively hold the cutting blades in overlapping relation throughout the entire range of self-adjusting pivotal movement of the cutter assemblies. The independent spring-loaded mounting of each blade causes the blades to assume an initial curved configuration before the pear reaches the blades, and permits the blades to conform to the arced curvature of the stem end of the pear, to gradually flatten their arc as they traverse the butt end, and to return to the initial curved configuraion when the pear passes out of contact with the blades.

Having thus described my invention what I claim as new and desire to protect by Letters Patent is:

1. A peeling head comprising a pair of guide rollers disposed in end-to-end axial alignment, each roller having a curved contact surface adapted to roll along the surface of a pear, an elongated curved cutting blade carried by each roller, said blades being disposed in uniformly spaced relation to the pear contacting surfaces of said rollers and in aligned overlapping relation with each other to provide a continuous curved cutting edge, and means mounting said guide rollers for movement relative to each other between a position in which said blades define a cutting edge having the sharply arced configuration of the stem end of a pear and a position in which said blades define a cutting edge having the relatively flat arced configuration of the butt end of a pear.

2. In a peeling machine, a peeling head comprising a pair of cutter assemblies disposed in side-by-side relation, each assembly including a guide roller and an elongated rigid curved cutting blade disposed in spaced relation to the surface of said guide roller, and means mounting said cutter assemblies for angular movement relative to each other between a plurality of adjusted positions in each of which said rollers are in aligned, abutting position and the end of one cutting blade lies behind the end of the other blade.

3. A peeling head comprising a rod, a yoke carried by said rod and having two spaced arms, a cutter assembly mounted on the inner side of each arm, each assembly having a curved cutting blade, and means mounting said cutter assemblies for angular movement relative to each other between a plurality of adjusted positions in each of which the end of one cutting blade lies behind the end of the other blade.

4. A peeling head comprising a support rod, a pair of angled arms pivotally mounted on said rod to define an expansible yoke, a curved blade mounted on the inner side of each yoke arm adjacent the free end thereof, and a spring connected between said arms to bias the arms toward each other and move said blades into overlapping position, movement of one of said arms relative to the other being effective to pivot the associated blade relative to the blade on the other arm.

5. A peeling head comprising a support rod, a pair of curved arms pivotally mounted on said rod to form an expansible yoke, hubs on the end portions of said arms disposed to project inwardly of said yoke toward each other in transversely aligned relation, a cutter assembly pivotally mounted in each hub, each cutter assembly having a curved cutting blade with an end portion disposed in overlapping relation with the blade of the other assembly in a plurality of angular positions of said expansible yoke, and means urging the arms of the yoke toward each other.

6. In a peeling machine, a peeling head comprising a shaft, a pair of yoke arms pivotally mounted on said shaft, a mounting plate pivotally mounted on each yoke arm, the pivot axes of said plates lying in a common plane, a cutter assembly mounted on each plate, each cutter assembly having a curved cutting blade with an end portion disposed behind the end portion of the blade of the other assembly in a plurality of pivoted positions of said yoke arms, and means urging said cutters into abutting position.

7. In a pear peeling machine, a peeling head comprising a pair of spools disposed in end-to-end relation in a common plane, a roller rotatably mounted on each spool, an elongated curved cutting blade mounted on each spool in spaced relation to the roller thereon and in aligned overlapping relation with the cutter on the other spool, and means mounting said spools for relative angular movement in said common plane.

8. In a peeling machine, a peeling head comprising a rod, a pair of yoke arms pivotally mounted on said rod for movement in a direction transverse to said rod, a plate pivotally mounted on each arm, a spool rotatably mounted on each plate, the spool on one plate being adjacent to and in transverse alignment with the spool on the other plate, a guide roller on each spool, a curved blade mounted on each spool in fixed position relative to the surface of the roller thereon and in overlapping relation with the blade on the other spool, and a spring disposed between each plate and the associated spool, each spring being arranged to urge the associated spool away from the adjacent plate and into end-to-end contact with the spool on the other plate, and pivotal movement of said yoke arms relative to each other being effective to cause relative angular movement of said blades.

9. In a peeling machine, a peeling head comprising a support member, and two curved cutting blades having overlapping end portions and being mounted in aligned relation on said support member for independent pivoting movement in a common plane from an initial position defining a continuous arced cutting edge to a position defining a relatively flat continuous cutting edge and back to said initial position.

10. A peeling head comprising a support rod, a pair of arms pivotally mounted on said rod in spaced, aligned relation to define an expansible yoke, a mounting plate pivotally mounted on the inner side of each arm adjacent the free end thereof, each plate having a tubular shaft projecting inwardly of the yoke, a spool slidably mounted on each tubular shaft, a guide roller rotatably mounted on each spool, a cutting blade secured to each spool and having a curved cutting edge uniformly spaced from a guide portion of the adjacent roller, the inner end of one of said cutting blades being disposed behind the inner end of the other blade, a spring disposed between each mounting plate and one of said spools, said springs being arranged to bias said spools toward each other, means for anchoring said spools together against movement outwardly of the yoke, and means for urging said pivotal arms toward each other to effect relative angular movement of said blades.

11. In a peeling machine, the combination of means for supporting a pear to be peeled with the stem-blossom axis in a predetermined position, a pair of cutter support members adjacent said pear support means, a cutter assembly mounted on each support member, the cutter assembly on one member being in aligned end-to-end relation with the cutter assembly on the other support member, said cutter assemblies having curved cutting blades with the free end portion of the blade of one assembly disposed behind the end portion of the blade of the other assembly, and means mounting each support member for adjusting movement in a plane transverse to the axis of the pear to effect relative angular movement of said blades.

12. In a pear peeling machine of the type in which a peeling head is drawn longitudinally along the surface of a pear that is impaled axially on a spindle and held in fixed position, a peeling head comprising a support rod, a pair of arms pivotally mounted on said rod for swinging movement toward and away from each other in a direction transverse to the axis of the pear, a cutter assembly mounted on each arm, said cutter assemblies having curved cutting blades with an end portion of the blade of one assembly disposed behind the end portion of the blade of the other assembly, and means connected between said arms and arranged to bias said arms toward each other to urge said cutter assemblies into abutting relation and to effect relative angular movement of said blades.

13. A peeling head comprising a support member arranged to be moved along a predetermined path, and two curved blades mounted on said support member for movement therewith along said path and for angular movement relative to each other and transverse to said path, the end of one blade being disposed behind the adjacent end of the other blade in all angular positions of said blades.

References Cited in the file of this patent
UNITED STATES PATENTS
2,699,191   De Back et al. _____ Jan. 11, 1955